United States Patent
Belpanno et al.

(10) Patent No.: US 9,254,524 B2
(45) Date of Patent: Feb. 9, 2016

(54) END-KNURLING DEVICE

(71) Applicants: Sandro G. Belpanno, Spencerport, NY (US); Paul W. Allart, Pittsford, NY (US)

(72) Inventors: Sandro G. Belpanno, Spencerport, NY (US); Paul W. Allart, Pittsford, NY (US)

(73) Assignee: Brinkman Products, Inc., Rochester, NY (US)

( * ) Notice: Subject to any disclaimer, the term of this patent is extended or adjusted under 35 U.S.C. 154(b) by 368 days.

(21) Appl. No.: 13/726,328

(22) Filed: Dec. 24, 2012

(65) Prior Publication Data
US 2014/0174142 A1    Jun. 26, 2014

(51) Int. Cl.
*B23B 27/24* (2006.01)
*F16B 19/02* (2006.01)
*F16H 1/08* (2006.01)

(52) U.S. Cl.
CPC ............. *B23B 27/24* (2013.01); *F16B 19/02* (2013.01); *F16H 1/08* (2013.01)

(58) Field of Classification Search
CPC .............. B23B 27/24; B23B 2260/004; B23B 2265/08; B23B 31/123; F16B 19/02; F16H 1/04
See application file for complete search history.

(56) References Cited

U.S. PATENT DOCUMENTS

| | | | | |
|---|---|---|---|---|
| 5,379,623 | A | * | 1/1995 | Drewalowski ................ 72/104 |
| 5,568,743 | A | * | 10/1996 | Oppelt .......................... 72/121 |
| 6,988,388 | B2 | * | 1/2006 | Allart et al. .................... 72/104 |
| 8,250,893 | B2 | | 8/2012 | Richter et al. |

OTHER PUBLICATIONS

Stafford Special Tools, End Rolling Heads Parts Catalog, Sep. 8, 2008, http://staffordspecialtools.com, Worcester, Massachusetts.

* cited by examiner

*Primary Examiner* — Peter DungBa Bo
*Assistant Examiner* — John S Lowe
(74) *Attorney, Agent, or Firm* — Phillips Lytle LLP

(57) ABSTRACT

An improved knurling device (20) includes a body (21) having an axis of elongation (x-x), and has a first part (22) and a second part (23). The body first part has axially-spaced front and center plates (24, 25, respectively). The body second part is mounted on the center plate, and is selectively rotatable about the axis relative to the center plate. A plurality of knurl rolls (26, 26, 26) are mounted on the body first part between the front and center plates. An arbor (28) is axially mounted on the body second part, and is biased to move toward the front plate. The end of a rotating workpiece (W) is adapted to be axially inserted through the front plate and moved toward the body second part between the knurl rolls to roll a knurl pattern on the workpiece. The angular relationship between the knurl rolls is continuously maintained at all times.

20 Claims, 6 Drawing Sheets

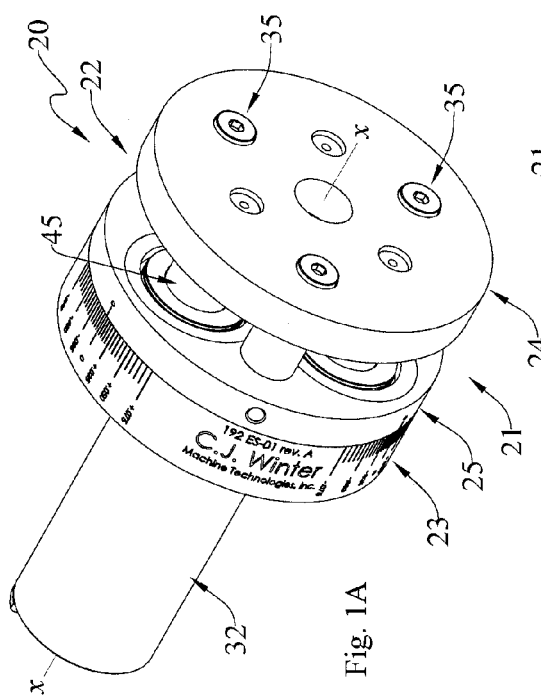
Fig. 1A
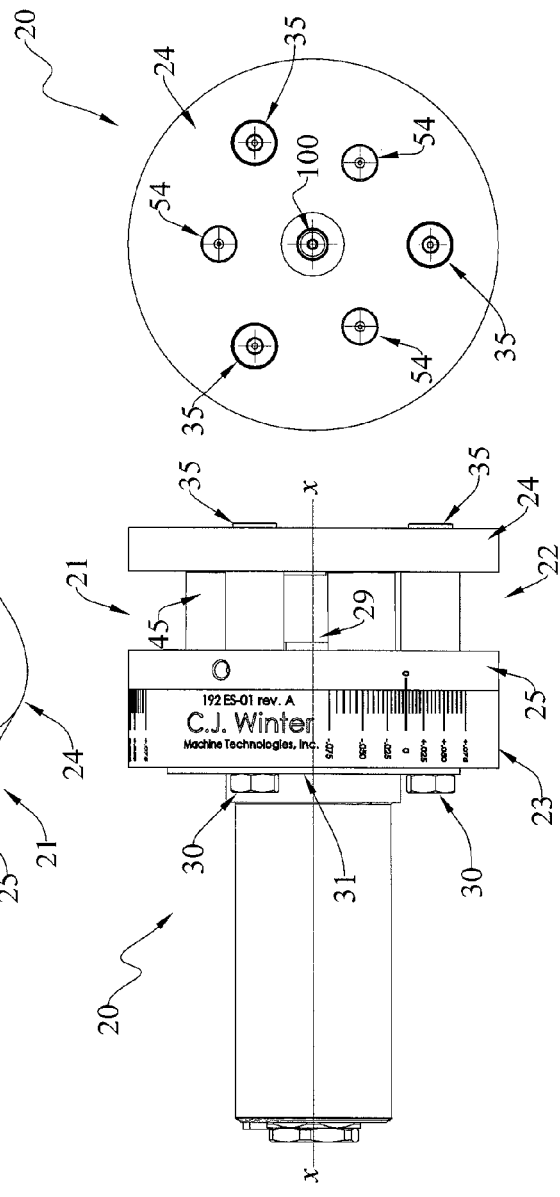
Fig. 1B
Fig. 1D
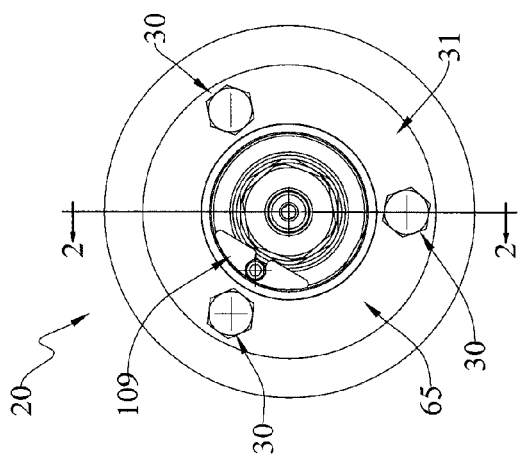
Fig. 1C

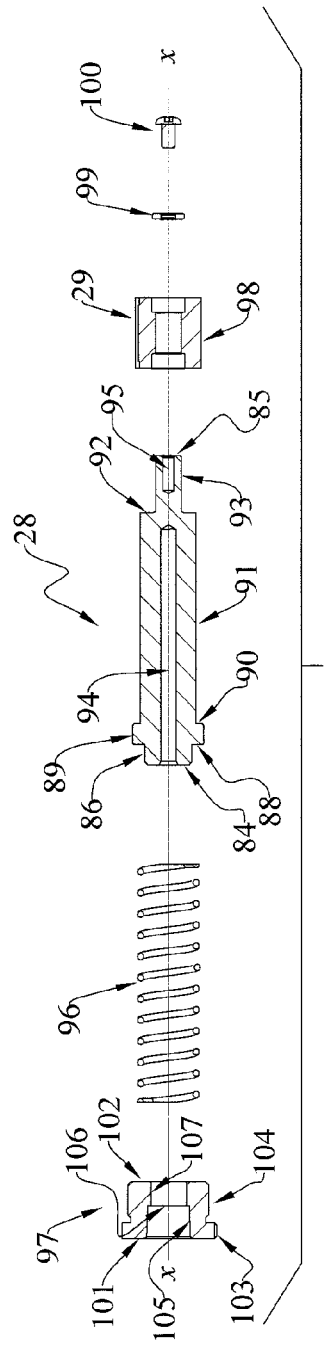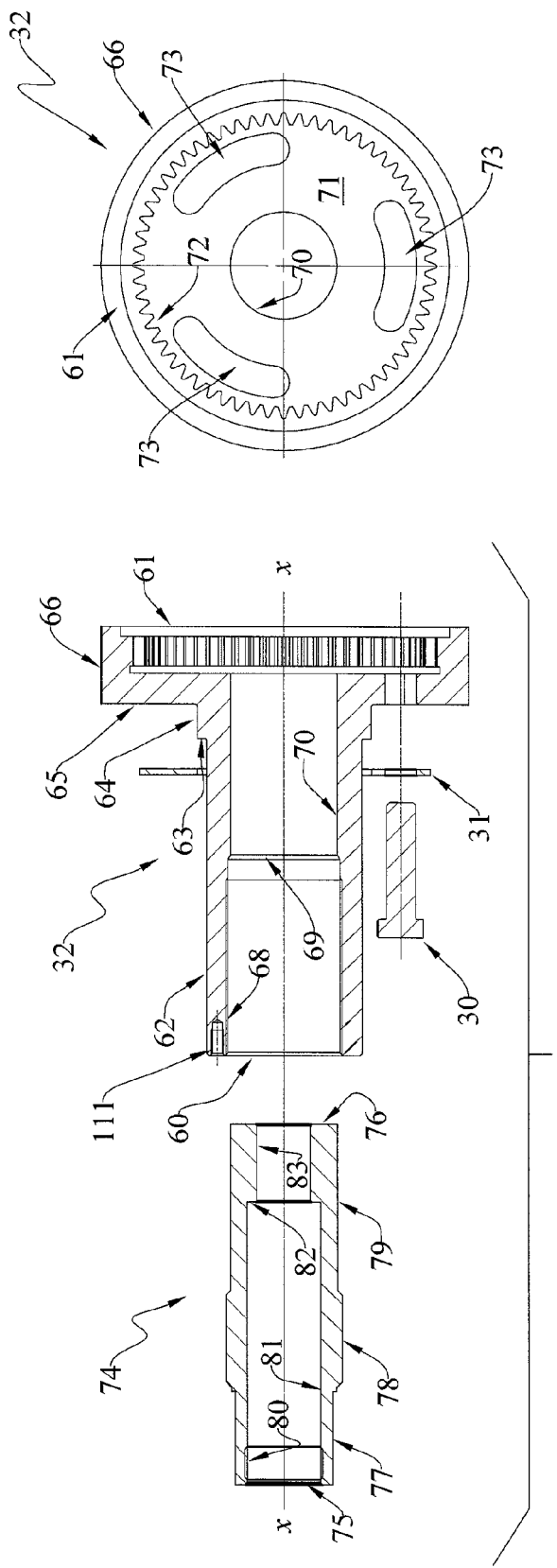
Fig. 4B
Fig. 4A
Fig. 5

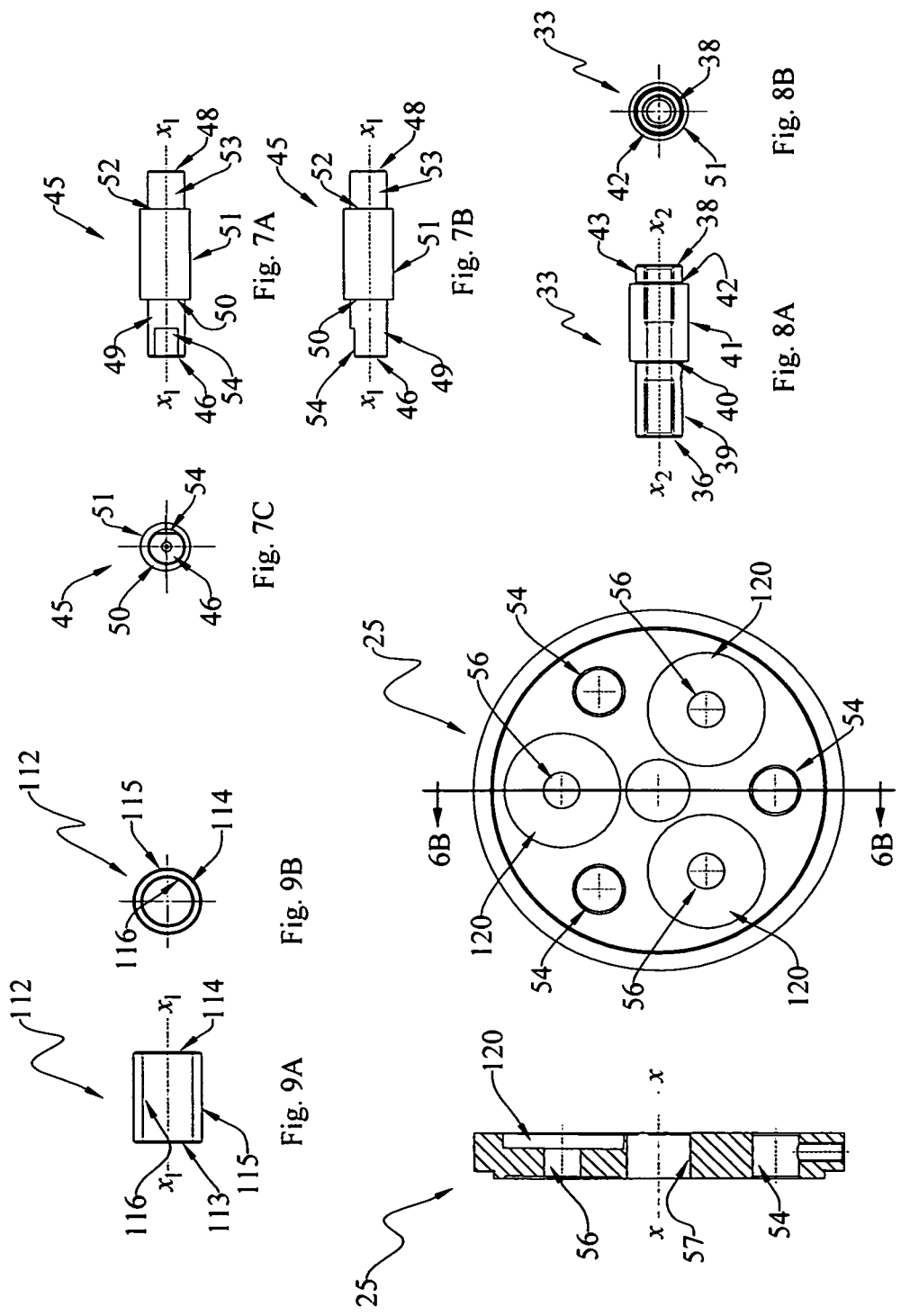

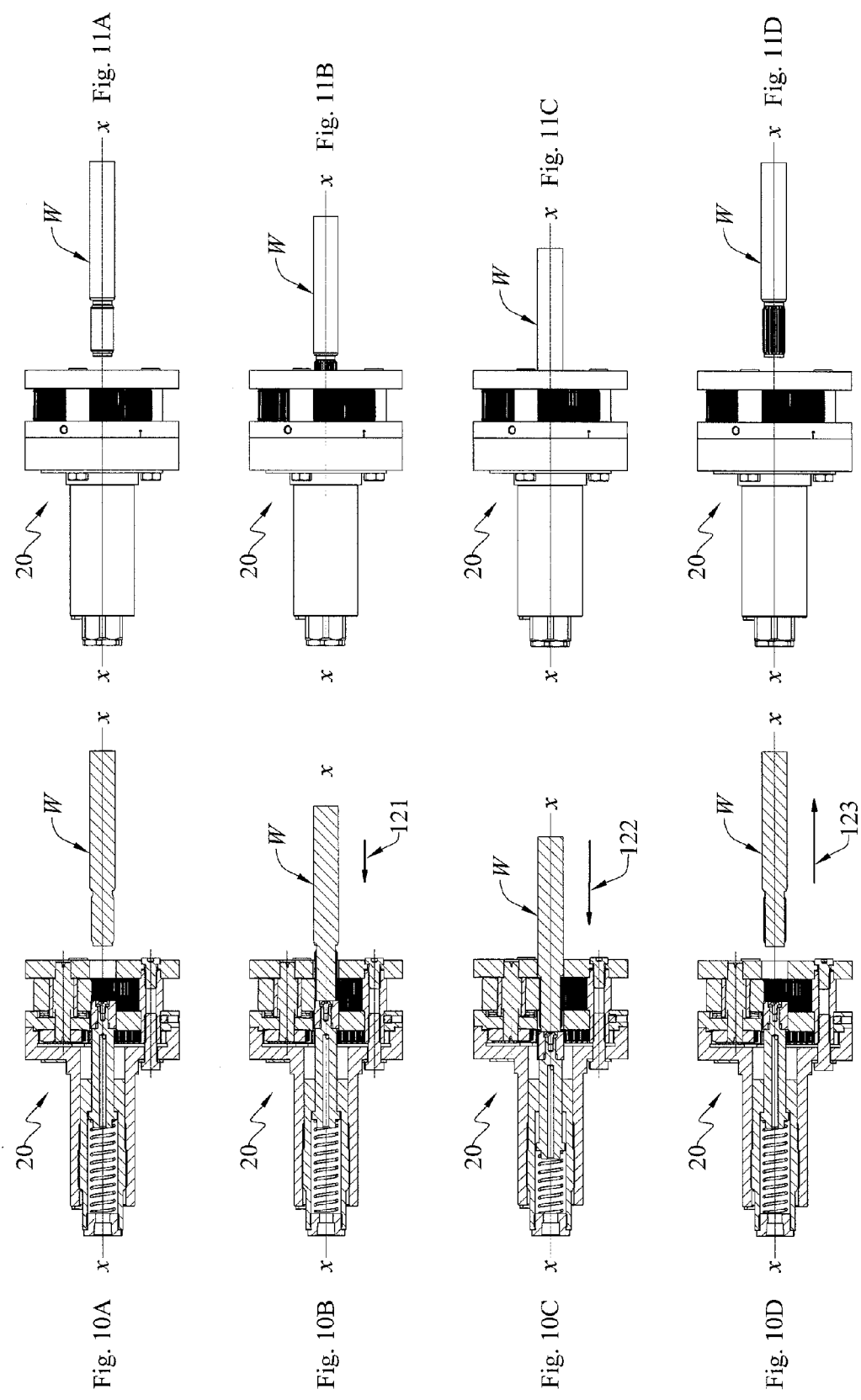

US 9,254,524 B2

END-KNURLING DEVICE

TECHNICAL FIELD

The present invention relates generally to knurling devices, and, more particularly, to an improved end-knurling device for rolling a knurl pattern on a marginal end portion of a workpiece.

BACKGROUND ART

Knurling devices are, of course, known.

One example of a prior art knurling device is shown and described in U.S. Pat. No. 8,250,893 B2.

Another type of prior art knurling device is made by Form Roll Die Company, and, more particularly, by Stafford Special Tools, 88 Webster Place, Worcester, Mass. 01603.

However, to make certain adjustments on this device, as many as twenty-three screws and three bolts must be removed and/or adjusted. This required as much as a day of down-time, and also required a highly-skilled operator to make the adjustments.

A structurally-similar thread-rolling attachment is shown and described in U.S. Pat. No. 6,988,388 B2.

Accordingly, it would be generally desirable to provide an improved knurling device that would be simple in structure, easy to use, and easy to adjust.

DISCLOSURE OF THE INVENTION

With parenthetical reference to the corresponding parts, portions or surfaces of the disclosed embodiment, merely for purposes of illustration and not by way of limitation, the present invention broadly provides an improved knurling device (20).

The improved knurling device for rolling a knurl pattern onto the surface of a rotating workpiece, broadly includes: a body (21) having an axis of elongation (x-x), and having a first part (22) and a second part (23); the body first part having axially-spaced annular front and center plates (24, 25, respectively); the body second part being mounted on the center plate and being selectively rotatable about the body axis (x-x) relative to the center plate; a plurality of knurl rolls (26, 26, 26) mounted on the body first part between the front and center plates, the radial spacing of the knurl rolls from the body axis being a function of the relative angular position between the body first body part and the center plate, each of the knurl rolls having an outer surface provided with a knurl pattern thereon; an arbor (28) mounted on the body second part and biased to move axially toward the front plate; a master pinion (29) rotatably mounted on the arbor and having an a knurled outer surface adapted to selectively engage the outer surface of each of the knurl rolls as a function of the axial position of said workpiece relative to the body second part; and wherein the end of a rotating workpiece (W) is adapted to be axially inserted through the front plate central opening and then moved toward the body second part for first accelerating the knurl rolls to the surface speed of the workpiece surface, and then for progressively rolling a knurl pattern on the outer surface of the workpiece as the workpiece is moved further into the improved device toward the body second part and wherein the angular relationship between the knurl rolls is continuously maintained by the engagement of the knurl pattern on the knurl rolls with the master pinion knurled outer surface and/or the knurl pattern rolled onto the workpiece outer surface.

The improved device may further include: a plurality of pins (45, 45, 45), each pin having a front marginal end portion journalled on the front plate, having an eccentric portion (51), and having a rear portion penetrating the center plate and having a rearward distal marginal end portion extending beyond the center plate, and wherein a knurl roll is rotatably mounted on the eccentric portion.

A carbide bushing (112) may be positioned between the eccentric portion and the knurl roll.

Each knurl roll is adapted to rotate relative to its associated bushing, and wherein each bushing is adapted to rotate relative to the pin eccentric portion about which it is mounted.

Each pin may have an axis of elongation $(x_1-x_1)$, and wherein each pin axis may be arranged at an angle with respect to a line parallel to the body axis (x-x).

The radial spacing between the pin axis $(x_1-x_1)$ and the body axis (x-x) may be less proximate the front plate than it is proximate the center plate. In one form, this angle may be about 0.5°.

A toothed sector or gear (58) may be mounted on the distal marginal end portion of each pin for rotation therewith.

The body second part may have a toothed portion engaging each toothed portion.

In a preferred form, the body second part toothed portion is a ring gear (72).

The improved device may further include at least one riser (33, 33, 33) positioned between the front and center plates for maintaining the spacing between the front and center plates.

A first fastener (35) may act between the front plate and riser.

The body second part may have an angular slot (73, 73, 73), and a second fastener (30, 30, 30) may act between the body second part and the riser, with a portion of each second fastener penetrating a respective slot.

The second fasteners (30, 30, 30) may be selectively loosened to permit relative rotation between the body first and second parts about the body axis (x-x), and may be selectively tightened to prevent relative rotation between the body first and second parts.

The master pinion (29) may be rotatably mounted on the arbor.

The body second part may have a rearwardly-facing abutment surface (82), and the arbor may have a stop surface (90) arranged to face toward the body second part abutment surface for limiting forward movement of the arbor relative to the body.

The improved device may further include a sleeve (74) positioned between the body second part and the arbor, and the abutment surface (82) may be mounted on the sleeve. The axial position of the sleeve relative to the body second part may be adjustable.

A spring retainer (97) may be mounted on the adjustment sleeve.

A spring (96) may act between the spring retainer and the arbor.

Accordingly, the general object is to provide an improved knurling device.

Another object is to provide an improved end-knurling device that may be adjusted more simply than prior art devices.

These and other objects and advantages will become apparent from the foregoing and ongoing specification, the drawings, and the appended claims.

BRIEF DESCRIPTION OF THE DRAWINGS

FIG. 1A is an isometric view of the improved knurling device, looking at the right front corner thereof, with the knurl rolls removed.

FIG. 1B is a side elevation of the improved knurling device shown in FIG. 1A.

FIG. 1C is a left end elevation of the improved knurling device shown in FIG. 1B.

FIG. 1D is a right end elevation of the improved knurling device shown in FIG. 1B.

FIG. 4A is a fragmentary longitudinal vertical sectional view of the shank, showing the washer, one bolt and the adjusting sleeve in exploded aligned relation thereto.

FIG. 4B is a right end elevation of the shank sectionally shown in FIG. 4A.

FIG. 5 is a fragmentary vertical longitudinal sectional view of the pinion arbor, showing the spring and spring retainer in exploded aligned relation to the left thereof, and also showing the master pinion, the washer and the retaining screw in exploded aligned relation to the right thereof.

FIG. 6A is a right end elevation of the intermediate plate.

FIG. 6B is a fragmentary longitudinal vertical sectional view of the intermediate plate, taken generally on line 6A-6B of FIG. 6A.

FIG. 7A is a top plan view of one of the eccentric roll pins.

FIG. 7B is a side elevation of the eccentric roll pin shown in FIG. 7A.

FIG. 7C is a left end elevation of the eccentric roll pin shown in FIG. 7A.

FIG. 8A is a side elevation of one of the risers.

FIG. 8B is a right end elevation of the riser shown in FIG. 8A.

FIG. 9A is a side elevation of one of the carbide bushings.

FIG. 9B is a right end elevation of the carbide bushing shown in FIG. 9A.

FIG. 10A is a fragmentary longitudinal vertical sectional view of the improved device, with a rotating workpiece upon which a knurl is to be formed being shown in exploded aligned relation thereto.

FIG. 10B is a view similar to FIG. 10A, but shows the workpiece as having been moved leftwardly so as to enter the improved device and engage the end face of the master pinion.

FIG. 10C is a view similar to FIG. 10B, but shows the rotating workpiece as having been further inserted into the device so as to further displace the arbor leftwardly, and to roll a knurl on the workpiece.

FIG. 10D is a view similar to FIG. 10C, but shows the rotating workpiece as having been moved rightwardly and withdrawn from the device.

FIG. 11A is a side elevation of the structure shown in FIG. 10A.

FIG. 11B is a side elevation of the structure shown in FIG. 10B.

FIG. 11C is a side elevation of the structure shown in FIG. 10C.

FIG. 11D is a side elevation of the structure shown in FIG. 10D.

DESCRIPTION OF THE PREFERRED EMBODIMENTS

Figure 2:
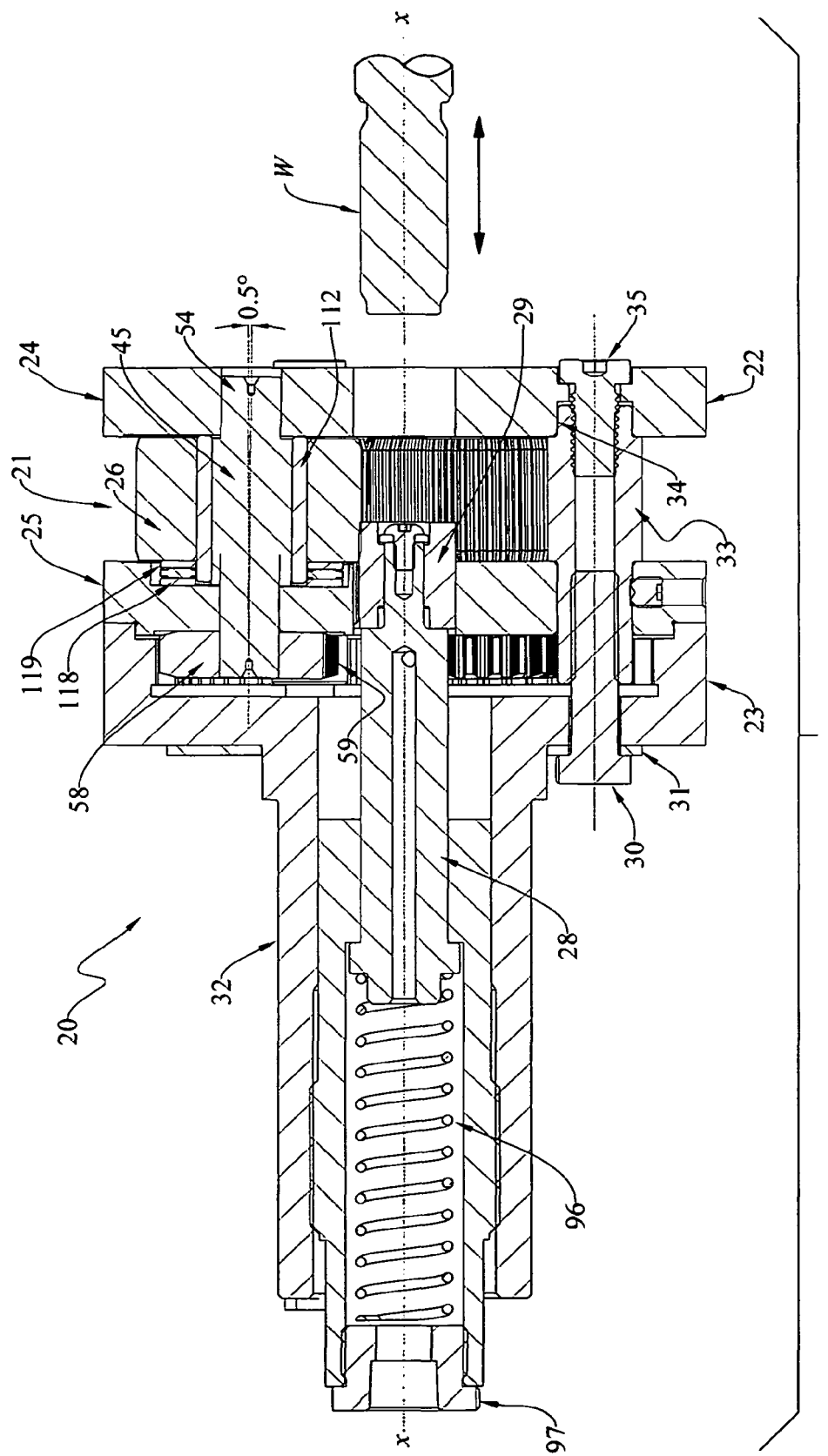
FIG. 2 is an enlarged-scale fragmentary longitudinal vertical sectional view of the improved knurling device, taken generally on line 2-2 of FIG. 1C, with the knurl rolls installed, and also showing a workpiece in exploded aligned relation thereto.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Structure of Disclosed Embodiment

Figure 3:
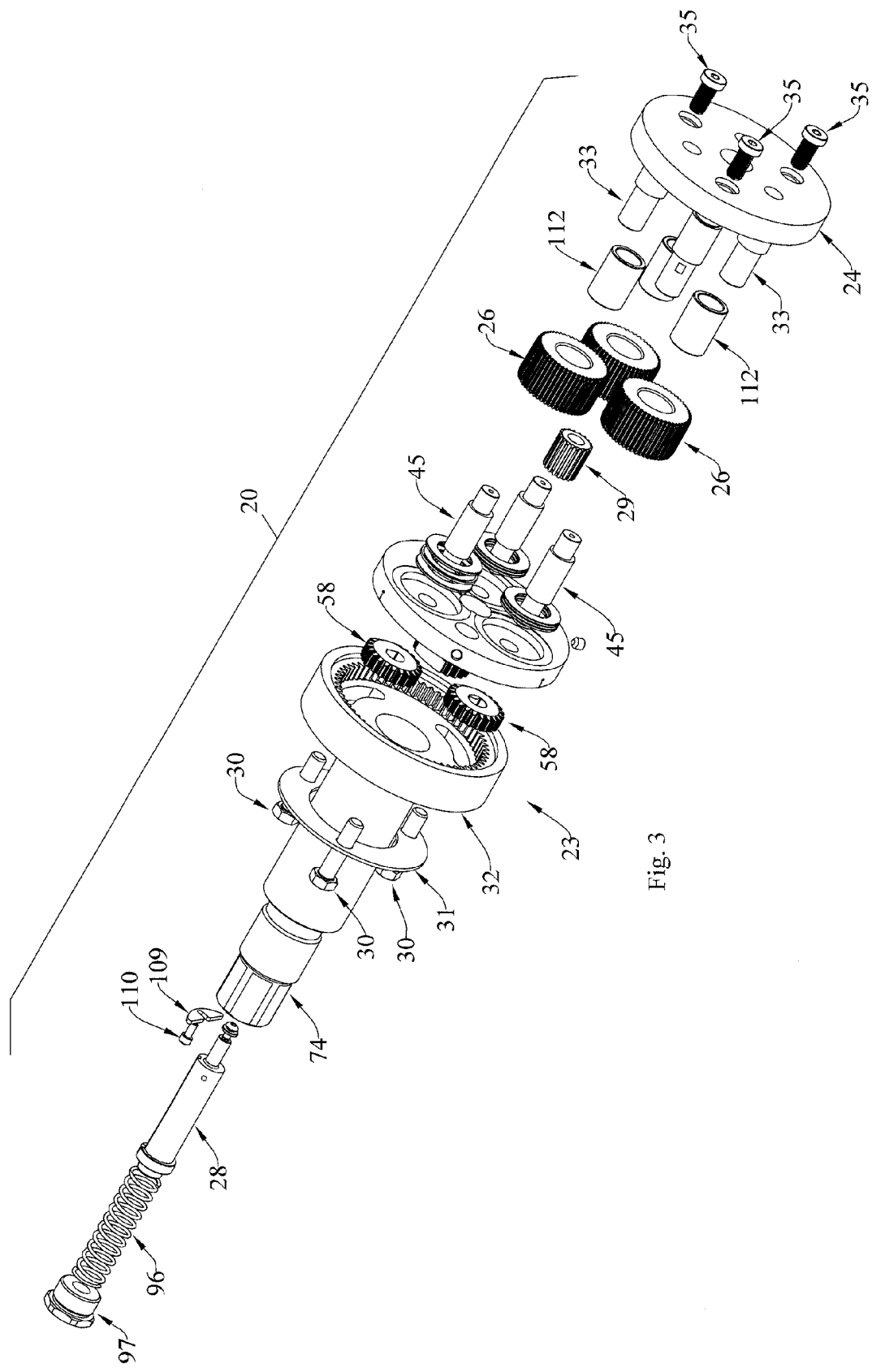
FIG. 3 is an exploded isometric view of the improved knurling device.

Turning now to the drawings, and more particularly to FIGS. 1-3 thereof, the present invention broadly provides an improved knurling device, of which the presently-preferred form is generally indicated at 20.

The improved device is shown as having an assembled body, generally indicated at 21, having a horizontal axis of elongation x-x. The body has a first part 22 and a second part 23. The first part 22 has axially-spaced annular vertical front and center plates 24, 25, respectively. The body second part 23 is operatively mounted on the center plate 25, and is adapted to be selectively rotated about body axis x-x relative to the center plate.

A plurality of knurl rolls, severally indicated at 26, are mounted on the body first part between the front and center plates. These knurl rolls have been omitted from FIGS. 1A-1D for clarity of illustration, but are clearly shown in FIGS. 2 and 3. The radial spacing of these knurl rolls from body axis x-x is a function of the relative angular position between the body first and second parts 22, 23, as hereinafter explained.

A piston-like arbor 28 is axially mounted on the body second part and is biased to move axially toward the front plate. A master pinion 29 is mounted on the right marginal end portion of the arbor, and has its outer surface engaging the outer surface of each of the knurl rolls to maintain the relative angular positions and timing of the knurl rolls.

One end of a rotating workpiece W is adapted to be axially inserted through the front plate central opening, and moved rearwardly relative thereto to first accelerate the knurls to the surface speed of the rotating workpiece, and to thereafter begin to cause the knurl rolls to progressively roll a knurl pattern on the outer surface of the workpiece as the arbor is progressive displaced further into the device.

As best shown in FIGS. 1B, 1C, 2 and 3, the body second part 23 is rotatable relative to the body first part 22. However, these body parts are adapted to be releasably secured together via a plurality of fasteners, severally indicated at 30, which pass through holes provided in a washer 31. The shank portions of fasteners 30 pass through angular slots provided in a shank member 32, and have their threaded marginal end portions received in tapped holes provided in risers 33.

As best shown in FIG. 2, the right marginal end portions of risers 33 are received in rearwardly-facing recesses 34 provided in the front plate, and are secured to the front plate by means of fasteners 35, which have their threaded shank portions matingly received in the right marginal end portion of risers 33.

Referring now to FIGS. 8A and 8B, each riser 33 is shown as being a horizontally-elongated member, generated about axis $x_2$-$x_2$, having an annular vertical left end face 36, an annular vertical right end face 38, and an outer surface that sequentially includes (from left-to-right): a horizontal cylindrical portion 39 extending rightwardly from the outer margin of left end face 36, a leftwardly-facing annular vertical shoulder 40, a horizontal cylindrical surface 41 continuing rightwardly from shoulder 40, a rightwardly-facing annual vertical shoulder surface 42, and a horizontal cylindrical surface 43 continuing rightwardly therefrom to join the outer margin of right end face 38. As previously noted, each riser has an axial through-hole with tapped left and right marginal end portions to matingly receive the threaded marginal end portions of fasteners 30, 35, respectively. Riser axis $x_2$-$x_2$ parallel to body axis x-x.

Three circumferentially-spaced eccentric roll pins, severally indicated at 45, are mounted on the body front part between the front and center plates. As best shown in FIGS. 7A-7B, each roll pin is generated about an axis $x_1$-$x_1$, and has an annular vertical left end face 46, an annular vertical right end face 48, and an outer surface that sequentially includes (from left-to-right in FIGS. 8A and 8B): a horizontal cylindrical surface 49 extending rightwardly from the outer margin of left end face 46, a leftwardly-facing annular vertical shoulder surface 50, a horizontal cylindrical surface 51, a rightwardly-facing annular vertical shoulder surface 52, and a horizontal cylindrical surface 53 extending rightwardly therefrom to join the outer margin of right end face 48. Surface 49 is provided with a flat 54. Thus, the left marginal end portion of each roll pin has a somewhat D-shaped transverse cross-section that is received in a complementarily-configured opening in a toothed gear or sector, as hereinafter explained. Cylindrical surface 51 is generated about pin axis $x_1$-$x_1$ and is radially spaced from, body axis x-x. Pin axis $x_1$-$x_1$ is also inclined at an angle of about 5° with respect to a line parallel to body axis x-x.

As best shown in FIG. 2, the right marginal end portion 54 of each roll pin is received in a rearwardly-facing opening 55 provided in the front plate. The left marginal end portion of each pin penetrates a respective opening 56 provided in the center plate. The distal marginal end portions of pins 45 are adapted receive a gear or geared segment 58. These gears 58 have D-shaped central openings that are arranged to receive the D-shaped marginal end portions of the respective roll pins. Thus, each gear 58 is mounted fast on a respective one of the eccentric roll pins for rotation therewith. These gears have outer teeth 59 that are adapted to mesh with the teeth of a ring gear 72 formed on the inner surface of shank 32.

As best shown in FIGS. 4A and 4B, shank 32 is shown as being a specially-configured horizontally-elongated member having an annular vertical left end face 60, an annular vertical right end face 61, and an outer surface that sequentially includes (from left-to-right in FIG. 4A): a horizontal cylindrical surface 62 extending rightwardly from the outer margin of left end face 60, a leftwardly-facing annular vertical shoulder 63, a horizontal cylindrical surface 64 continuing rightwardly therefrom, a leftwardly-facing annular vertical surface 65, and a horizontal cylindrical surface 66 continuing rightwardly therefrom to join the outer margin of right end face 61. The shank is provided with a stepped axial through-bore that includes (again from left-to-right in FIG. 4A): an internally-threaded portion 68 extending rightwardly from the inner margin of left end face 60, a leftwardly- and inwardly-facing frusto-conical surface 69, a horizontal cylindrical surface 70 continuing rightwardly therefrom, a rightwardly-facing annular vertical surface 71, and a inwardly-facing toothed portion of a ring gear 72 adjacent right end face 61. As previously noted, the shank is provided with three circularly-spaced angular slots, severally indicated at 73, that extend between surfaces 65, 71 to accommodate passage of the shank portions of fasteners 30, 30, 30, and to permit some limited relative rotation of the shank member 32 relative to the center plate 25 when bolts 30 are loosened.

Still referring principally to FIG. 4A, an adjusting sleeve 74 is adapted to be threaded into the left marginal end portion of the through-bore of shank 32. This adjusting sleeve is shown as having an annular vertical left end face 75, an annular vertical right end face 76, an outer surface that sequentially includes (from left to right in FIG. 4A): a horizontal polygonal surface 77 extending rightwardly from the outer margin of left end face 75, an externally-threaded intermediate portion 78, and a horizontal cylindrical surface 79 continuing rightwardly therefrom to join the outer margin of right end face 76. Sleeve 74 also has a stepped axial through-bore that includes: an internally-threaded portion 80 extending rightwardly from the inner margin of left end face 75, a horizontal cylindrical portion 81, a leftwardly-facing annular vertical abutment surface 82, and a horizontal cylindrical portion 83 continuing rightwardly therefrom to join the inner margin of right end face 76. Sleeve 74 is mounted on shank 32 with sleeve threads 78 matingly engaging shank threads 68. The extent to which sleeve 74 is threaded into engagement with shank 32 is used to selectively vary the axial position of rearwardly-facing abutment surface 82 on the assembled body second part 23. The assembled body second part includes shank 32 and sleeve 74.

As best shown in FIG. 5, pinion arbor 28 is a horizontally-elongated specially-configured member having an annular vertical left end face 84, an annular vertical right end face 85, and an outer surface that sequentially includes (from left-to-right): a horizontal cylindrical portion 86 extending rightwardly from the outer margin of left end face 84, a leftwardly-facing annular vertical surface 88, a horizontal cylindrical surface 89, a rightwardly-facing annular vertical surface 90, a horizontal cylindrical surface 91, a rightwardly-facing annular vertical surface 92, and a horizontal cylindrical surface 93 continuing rightwardly therefrom to join the outer margin of right end face 85. Surfaces 88, 89, 90 define an annular flange that extends radially outwardly from adjacent cylindrical surfaces 86, 91. An axial blind hole 94 extends forwardly into the arbor from its left end face 94. This hole communicates with a radial hole (not shown) that permits cutting fluid supplied to the rear of the device to pass through hole 94 and the radial opening to lubricate the various parts of the improved device. An axial tapped blind hole 95 extends rearwardly into the arbor from its right end face 85.

A compressed coil spring 96 acts between a spring retainer 97 and arbor flange surface 88.

A master pinion 29 having a knurled outer surface 98 is slipped over the forwardly-extending elongated neck (defined by cylindrical surface 93) that extends rightwardly from the arbor, and is secured thereto by means of a washer 99 and a screw 100 that is matingly received in arbor tapped hole 95.

The spring retainer 97 is shown as having an annular vertical left end face 101, an annular vertical right end face 102, an outer surface that sequentially includes a hexagonal portion 103 extending rightwardly from the outer margin of left end face 101, and an externally-threaded portion 104 continuing rightwardly therefrom to join the outer margin of right end face 102. The spring retainer is shown as also having a stepped axial through-bore which sequentially includes (from left-to-right): a horizontal cylindrical surface 105 extending rightwardly from the inner margin of left end face 101, a leftwardly-facing annular vertical surface 106, and a horizontal cylindrical surface 108 continuing rightwardly therefrom to join the inner margin of right end face 102. When the device is assembled, spring retainer threads 104 matingly engage adjustment sleeve threads 80, and the spring 96 is compressed between spring retainer right end face 102 and arbor flange surface 88.

As best shown in FIGS. 1C and 3, a brake member 109 is secured by a threaded fastener 110 that is received in a tapped blind hole 111 (FIG. 4A) that extends into the shank from its left end face 60. Brake member 109 has flat surfaces that engage the polygonal outer surface 77 of sleeve 74 to prevent unintended relative rotation of the sleeve relative to the shank.

Adverting now to FIGS. 2 and 3, the knurl rolls, severally indicated at 26, are horizontally-elongated cylindrical members having a knurl pattern on their outer surfaces. These knurl rolls are mounted on carbide bushings 112 that surround the eccentric portions 51 of pins 45. As best shown in FIGS. 9A and 9B, these carbide bushings 112 are horizontally-elongated cylindrical tubular members having an annular vertical left and right end faces 113, 114, respectively. They also have an outer cylindrical surface 115 and an inner cylindrical surface 116 that is adapted to face and slidably engage pin surface 51. Bushing outer surface 115 is arranged to face the inner cylindrical surface of the knurl rolls. In use, the knurl rolls rotate about eccentric pin surfaces 51. However, the bushings 112 also rotate relative to the pins 45. Thus, the knurl rolls are free to rotate relative to the bushings, and the bushings are free to rotate relative to the pins. As best shown in FIGS. 2 and 3, thrust washers 118 and thrust bearings 119 are received in pockets 120 formed in the center plate 25 (FIGS. 6A and 6B).

Operation

The device is assembled as shown in the drawings. A suitable lubricant is provided by suitable means (not shown) to the rear end of the device. This lubricant passes through the spring retainer, and flows into the chamber in which spring 96 is arranged. From there, it flows through the arbor bore and the radial opening (not shown) to lubricate the various rolls and moving parts. The device is mounted as a stand-alone device, or may be mounted on a suitable machine tool.

The sequence of operation is comparatively illustrated in FIGS. 10A-10D, and in FIGS. 11A-11D.

As shown in FIGS. 10A and 11A, a rotating workpiece W is first brought to a position adjacent the device. Note that the workpiece is axially aligned with device axis x-x.

As best shown in FIGS. 10B and 11B, the rotating workpiece is then axially inserted into the device to engage the distal end portion of the outer surfaces of the three knurl rolls. The magnitude and direction of such movement is indicated by arrow 121. When the rotating workpiece engages the knurl rolls, it quickly accelerates the knurl rolls' outer diameters to the surface speed of the outer diameter of the rotating workpiece. Since the master pinion normally engages the outer surfaces of the knurl rolls, such induced rotation of the knurl rolls also causes the master pinion to rotate about its axis at the surface speed of the outer diameter of the rotating workpiece. As the workpiece is progressively inserted into the device, the master pinion and arbor begin to move rearwardly (i.e., leftwardly in FIGS. 10A-10D). As this occurs, the knurl pattern is rolled from the knurl rolls onto the workpiece outer surface.

As shown in FIGS. 10C and 11C, the workpiece is further inserted into the device, this being indicated by the magnitude and direction of arrow 122. This further displaces the arbor and master pinion leftwardly, and further compresses the spring. Once the knurl pattern has begun to be rolled onto the workpiece, the engagement of the workpiece with the knurl rolls maintains the proper timed rotational relationship between the knurl rolls and the workpiece.

After the knurl pattern has been rolled on the workpiece, the still-rotating workpiece may simply be withdrawn from the device, this being indicated by the direction and magnitude of arrow 123 in FIGS. 10D and 11D. As the workpiece is withdrawn, the compressed spring expands and urges the arbor to move rightwardly until arbor stop surface 90 engages sleeve abutment surface 82. Since the master pinion is rotating at the same surface speed as the workpiece, such expansion of the spring allows the master pinion to re-engage with the knurl rolls to maintain the rotational timing and sequence between the master pinion and the knurl rolls.

To adjust the penetration depth of the knurl rolls, an operator need only loosen fasteners 30, 30, 30 and rotate the shank 32 relative to the body first part. As this occurs, the gears 58, 58, 58 rotate about their respective axes, and cause pins 45, 45, 45 to rotate. Since the knurl rolls are rotatably mounted on the pin eccentric surfaces 51, such rotation of the pins causes a change in the radial distance from the device axis to the knurl rolls. The direction of relative rotation between shank 32 and the body first part determines whether this radial distance is increased or decreased. Once in the proper angular position, fasteners 30, 30, 30 may be retightened to securely hold the device in the set-depth.

Therefore, the present invention broadly provides an improved knurling device (20) for rolling a knurl pattern onto a surface of a rotating workpiece. The improved knurling device includes: a body (21) having an axis of elongation (x-x), and having a first part (22) and a second part (23); the body first part having axially-spaced annular front and center plates (24, 25, respectively); the body second part being mounted on the center plate and being selectively rotatable about the body axis (x-x) relative to the center plate; a plurality of knurl rolls (26, 26,26) mounted on the body first part between the front and center plates, the radial spacing of the knurl rolls from the body axis being a function of the relative angular position between the body first part and the center plate, each of the knurl rolls having an outer surface provided with a knurl pattern thereon; an arbor (28) mounted on the body second part and biased to move axially toward the front plate; a master pinion (29) rotatably mounted on the arbor and having a knurled outer surface adapted to selectively engage the outer surface of each of the knurl rolls as a function of the axial position of the workpiece relative to the body second part; wherein the end of a rotating workpiece (W) is adapted to be axially inserted through the front plate central opening and then moved toward the body second part for first accelerating the master pinion to the surface speed of the workpiece outer surface, and then for progressively rolling a knurl pattern onto the outer surface of the workpiece as the workpiece is moved further into the improved device toward the body second part; and wherein the angular relationship between the knurl rolls is continuously maintained by the engagement of the knurl pattern on the knurl rolls with the master pinion knurled outer surface and/or the knurl pattern rolled onto the workpiece outer surface.

Upon information and belief, the present invention possesses a number of points of patentable distinction over the current state of the art. These relate to: (1) the use of the master pinion, (2) the use of a spring-loaded master pinion arbor, (3) the use of a 0.5° roll axis taper, (4) the use of an axially-positionable sleeve 78 with abutment surface 28 to selectively adjust the rightwardmost position of the master pinion, and (5) the use of a single adjustment/motion to coordinate the penetration amount of all three role axes using the ring gear, gear segments and eccentric pins, while maintaining the knurl roll angular synchronization or timing.

As to the first point, the use of a central master pinion to engage the outer working surfaces of the knurls provides relative rotational positioning or timing of the three knurl rolls. Moreover, the invention uses a central master pinion that is selectively engageable with the working surfaces of the rolls, such that the master pinion may disengage during the work cycle to expose the full workface of the rolls, and to allow the knurling of a workpiece that is substantially longer that the axial lengths of the knurl rolls.

As to the second point, the use of a spring-loaded master pinion arbor provides a mechanism for automatically re-engaging the master pinion when the workpiece is withdrawn, and re-establishing the relative timing of the rolls.

As to the third point, the use of a 0.5° roll axis taper biases the bulk of the deformation to the outboard (right) end of the knurl width. This allows for the workpiece to be fully formed very close to a shoulder, with little or no taper along the length of the resultant workpiece knur. This also allows for knurling roll tooling to be of any substantial width to be essentially "reversible". Since the bulk of the work and wear is biased to only the leading edge of the knurl, the knurl can be flipped so that the previously-trailing edge can be re-installed as a second leading edge, thereby effectively doubling the useful life of the tooling. The use of the 0.5° angle allows for a variable gear mesh diameter between the leftmost and rightmost ends of the knurl roll workface. This feature is used in conjunction with an axially-positionable sleeve (described infra) to adjust gear backlash.

With respect to the fourth point, the use of an axially-positionable sleeve with an abutment sleeve can be used to selectively adjust the rightwardmost position of the master pinion. Used in conjunction with the variable gear mesh diameter established by the 0.5° roll pin taper angle, this feature allows the user to increase or decrease the gear mesh backlash between the master pinion and the knurl rolls. This ability to adjust the backlash is critical to ensuring the proper rolling action of the knurls, without binding the "gear train" that keeps the knurls angularly in synchronism with one another, so that each tooth on each successive knurl falls into the groove partially created by the previous knurl, as the part rotates.

Finally, with respect to the fifth point, the use of a single adjustment/motion coordinates the extent of penetration of all three roll axes using the ring gear, gear segments and eccentric pins, while maintaining the angular synchronism of all three knurl rolls. Single-motion penetration adjustment exists on some prior art thread rolling heads, but, upon information and belief, has never been sued in conjunction with rolls that have had to be synchronized for more than one revolution in order to function. This is an exceedingly difficult thing to do because a timing gear train normally operates of a fixed mesh diameter, but to adjust the penetration amount, one must vary the mesh diameter.

Modifications

The present invention contemplates that many changes and modifications may be made. The sleeve and arbor may be formed separately, as described, or may be formed integrally, as desired. While it is presently preferred that the roll pin axes are inclined by some small angle (i.e., 5°) such that the forward end of the knurl rolls bites more deeply into the workpiece that the rearward end thereof, this is not invariable. The particular knurl pattern may be changed by changing the master pinion and the knurl rolls.

The spacers may be formed integrally with plate 24 or plate 25, as desired. The force supplied by spring 96 may be supplemented or replaced by fluid pressure magnetic force, or some other means The bushings may be removed entirely, allowing the knurl rolls to rotate directly on the eccentric roll pins.

Plate 22 and spacers 33 may be eliminated, and roll pins 45 may be adapted to hold the lateral position of the knurl rolls, allowing for an "outboard" configuration to knurl directly adjacent to large diameter shoulders on the workpiece.

Therefore, while the presently-preferred form of the improved end-knurling device has been shown and described, and several possible modifications thereof discussed, persons skilled in this art will readily appreciate that various additional changes and modifications may be made without departing from the spirit of the invention, as defined and differentiated by the following claims.

What is claimed is:

1. A knurling device for rolling a knurl pattern onto a surface of a rotating workpiece, comprising:
    a body having an axis of elongation, and having a first part and a second part;
    said body first part having axially-spaced annular front and center plates;
    said body second part being mounted on said center plate and being selectively rotatable about said body axis relative to said center plate;
    a plurality of knurl rolls mounted on said body first part between said front and center plates, the radial spacing of said knurl rolls from said body axis being a function of the relative angular position between said body first part and said center plate, each of said knurl rolls having an outer surface provided with a knurl pattern thereon;
    an arbor mounted on said body second part and biased to move axially toward said front plate;
    a master pinion rotatably mounted on said arbor and having a knurled outer surface adapted to selectively engage the outer surface of each of said knurl rolls as a function of the axial position of said workpiece relative to said body second part;
    wherein the end of a rotating workpiece is adapted to be axially inserted through said front plate and moved toward said body second part for accelerating said knurl rolls and said master pinion to the surface speed of said workpiece surface, and for rolling a knurl pattern onto said workpiece outer surface as said workpiece is moved further toward said body second part; and
    wherein an angular relationship between said knurl rolls is continuously maintained by the engagement of the knurl pattern on said knurl rolls with said master pinion knurled outer surface and the knurl pattern rolled onto said workpiece outer surface.

2. A knurling device as set forth in claim 1, and further comprising:
    a plurality of pins, each pin having a front marginal end portion journalled on said front plate, having an eccentric portion, and having a rear portion penetrating said center plate and having a rearward distal marginal end portion extending beyond said center plate, and
    wherein each of said knurl rolls is rotatably mounted on said eccentric portion.

3. A knurling device as set forth in claim 2, and further comprising:
    a bushing positioned between said eccentric portion and each of said knurl rolls.

4. A knurling device as set forth in claim 3 wherein each of said knurl rolls is adapted to rotate relative to said bushing, and wherein said bushing is adapted to rotate relative to said pin eccentric portion.

5. A knurling device as set forth in claim 2 wherein each pin has an axis of elongation, and wherein each pin axis is arranged at an angle with respect to a line parallel to said body axis.

6. A knurling device as set forth in claim 5 wherein the radial spacing between said pin axis and said body axis is less proximate said front plate than it is proximate said center plate.

7. A knurling device as set forth in claim 5 wherein said angle is about 0.5°.

8. A knurling device as set forth in claim 2, and further comprising:
   a toothed sector mounted on the distal marginal end portion of each pin for rotation therewith.

9. A knurling device as set forth in claim 8 wherein said body second part has a toothed portion engaging each toothed portion.

10. A knurling device as set forth in claim 9 wherein said body second part toothed portion is a ring gear.

11. A knurling device as set forth in claim 1, and further comprising:
    at least one riser positioned between said front and center plates for maintaining the spacing between said front and center plates.

12. A knurling device as set forth in claim 11, and further comprising:
    a first fastener acting between said front plate and riser.

13. A knurling device as set forth in claim 11 wherein said body second part has an angular slot, and further comprising:
    a second fastener acting between said body second part and said riser, and wherein a portion of said second fastener penetrates said slot.

14. A knurling device as set forth in claim 11 wherein said second fastener may be selectively loosened to permit relative rotation between said body first and second parts about said axis, and may be selectively tightened to prevent relative rotation between said body first and second parts.

15. A knurling device as set forth in claim 1 wherein said master pinion is rotatably mounted on said arbor.

16. A knurling device as set forth in claim 1 wherein said body second part has a rearwardly-facing abutment surface and wherein said arbor has a stop arranged to face toward said body second part abutment surface for limiting forward movement of said arbor relative to said body.

17. A knurling device as set forth in claim 16, and further comprising:
    an adjustment sleeve positioned between said body second part and said arbor; and
    wherein said abutment surface is mounted on said adjustment sleeve.

18. A knurling device as set forth in claim 17 wherein the axial position of said adjustment sleeve relative to said body second part is adjustable.

19. A knurling device as set forth in claim 17, and further comprising:
    a spring retainer mounted on said adjustment sleeve.

20. A knurling device as set forth in claim 19, and further comprising:
    a spring acting between said spring retainer and said arbor.

* * * * *